United States Patent [19]

Bates

[11] Patent Number: 4,886,225

[45] Date of Patent: Dec. 12, 1989

[54] INFLATABLE FUEL TANK BUFFER

[75] Inventor: Jack R. Bates, Ridgecrest, Calif.

[73] Assignee: The United States of America as represented by the Secretary of the Navy, Washington, D.C.

[21] Appl. No.: 501,667

[22] Filed: Jun. 6, 1983

[51] Int. Cl.$^4$ .............................................. B64D 37/32
[52] U.S. Cl. ................................. 244/135 R; 220/900
[58] Field of Search ............ 244/135 R, 135 B, 129.2; 220/DIG. 900

[56] References Cited

U.S. PATENT DOCUMENTS

| | | | |
|---|---|---|---|
| 2,404,418 | 7/1946 | Walker | 244/135 R |
| 2,609,118 | 9/1952 | Cattaneo | 244/135 R |
| 2,623,721 | 12/1952 | Harrington | 244/135 R |
| 2,653,780 | 9/1953 | Pepersack | 244/135 B |
| 2,657,884 | 11/1953 | Merril | 244/135 B |
| 2,690,314 | 9/1954 | Porter et al. | 244/135 R |
| 2,735,635 | 2/1956 | Hoffman | 244/135 B |
| 2,736,356 | 2/1956 | Bender et al. | 150/5 |
| 2,844,269 | 7/1958 | Durbin | 220/900 |
| 3,737,125 | 6/1973 | Farmer | 244/135 B |
| 3,966,147 | 6/1976 | Wittko et al. | 244/135 B |

Primary Examiner—Trygve M. Blix
Assistant Examiner—Rodney Corl
Attorney, Agent, or Firm—Sol Sheinbein; Melvin J. Sliwka

[57] ABSTRACT

An inflatable bladder is placed between the wall of an aircraft inlet duct and the liquid fuel to reduce the potential damage caused by hydrodynamic ram effects from a projectile penetrating the fuel tank. The inflatable bladder is inflated by a regulated gas source prior to combat. The inflatable bladder may be formed as a double layered section of a rubber bladder fuel cell type fuel tank, or an inflatable bladder may be bonded to the inner surface of an integral fuel tank wall.

1 Claim, 2 Drawing Sheets

PRIOR ART Fig. 1
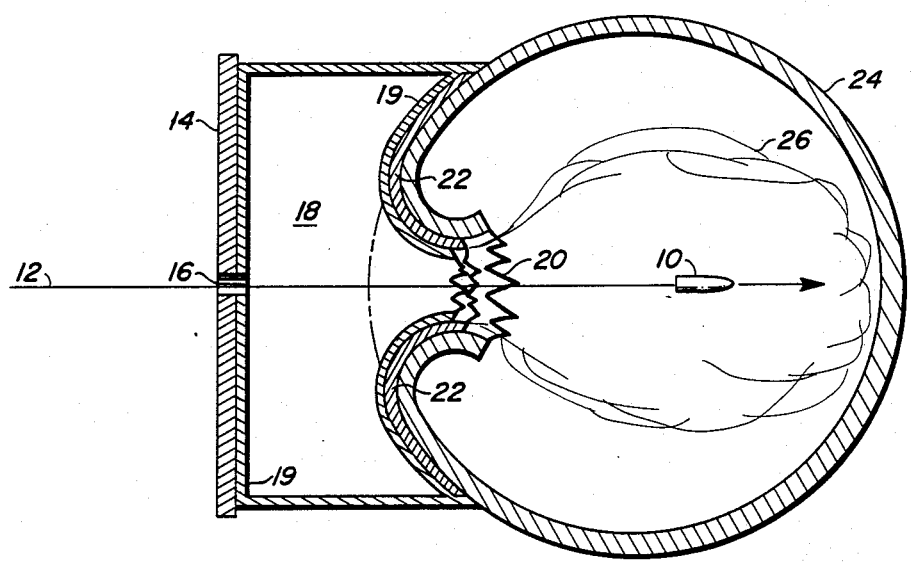
Fig. 2
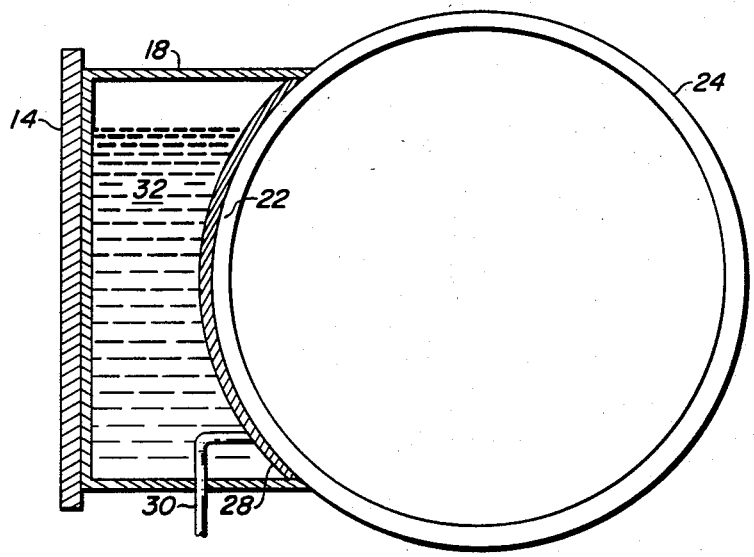
Fig. 3
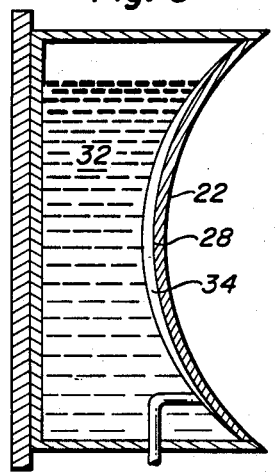

INFLATABLE FUEL TANK BUFFER

BACKGROUND OF THE INVENTION

1. Field of the Invention:

This invention relates to aircraft fuel tank devices which lessen the catastrophic results of ruptured fuel tanks. In particular, this invention pertains to inflatable fuel tank buffers for lessening the hydrodynamic ram effects accompanying projectile penetration through a fuel tank into an engine inlet.

2. Description of the Prior Art:

There are numerous devices which seek to lessen the severity of damage caused by projectiles, such as bullets, puncturing fuel tanks. Such devices include U.S. Pat. No. 2,404,418 to Walker for a Noncombustible Fuel Tank which uses either rigid or inflated inner cushions to provide a collection space for fuel, U. S. Pat. No. 2,735,635 to J. D. Hoffman which uses an inner gas barrier to lessen the possibility of ignition of fuel exiting a rupture, and U. S. Pat. No. 3,966,147 to Wittko et al. for a Hammock Supported Fuel Tank which uses gravity to provide a separation distance between the upper surface of fuel and the aircraft structure. These devices all seek to lessen the severe dangers posed when bullets penetrate a fuel tank. These dangers include fire as a specific threat because of the incendiary trail of the bullet, and ingestion of fuel by the aircraft's engine.

A primary kill mechanism of ballistic threats to combat aircraft is raw fuel ingestion. Aircraft fuel tanks typically are placed near engine inlet ducts on fighter type aircraft. If a projectile passes through the fuel tank, the hydrodynamic ram effects in the liquid fuel can cause severe damage to the surrounding structure resulting in dumping of large quantities of raw fuel directly into the engine inlet.

SUMMARY OF THE INVENTION

An inflatable bladder between the fuel and the fuel tank wall or between the fuel tank and the wall of the engine inlet is unpressurized during loading of fuel into the aircraft. In this deflated state, almost the entire volume of the fuel tank is available to hold fuel for the aircraft. At a preselected time during flight, usually after a certain quantity of fuel has been consumed, the bladder is inflated from a gas source to a regulated pressure which causes the fuel remaining in the fuel tank to be separated from the fuel tank wall by a predetermined gas space. Should a bullet now penetrate the fuel tank, the hydrodynamic ram effects in the liquid fuel are cushioned by the inflated bladder and are absorbed by compression of the gas space. The absorption of this hydrodynamic ram effect prevents the bullet from causing a large exit hole in the wall of the fuel tank and the wall of the engine inlet duct. The hole is only slightly greater than the dimensions of the bullet itself. As a result of the reduced size of the exit hole, the rate of fuel ingestion into the aircraft engine is reduced providing a significantly improved opportunity for the aircraft to survive and reducing the risk of catastrophic loss of the aircraft.

BRIEF DESCRIPTION OF THE DRAWING

FIG. 1 is a cross sectional view of catastrophic failure in an unprotected fuel tank;

FIG. 2 shows the present invention in the uninflated state within its normal use;

FIG. 3 shows the present invention in its inflated state comparable to FIG. 2;

DESCRIPTION OF THE PREFERRED EMBODIMENT

Figure 4:
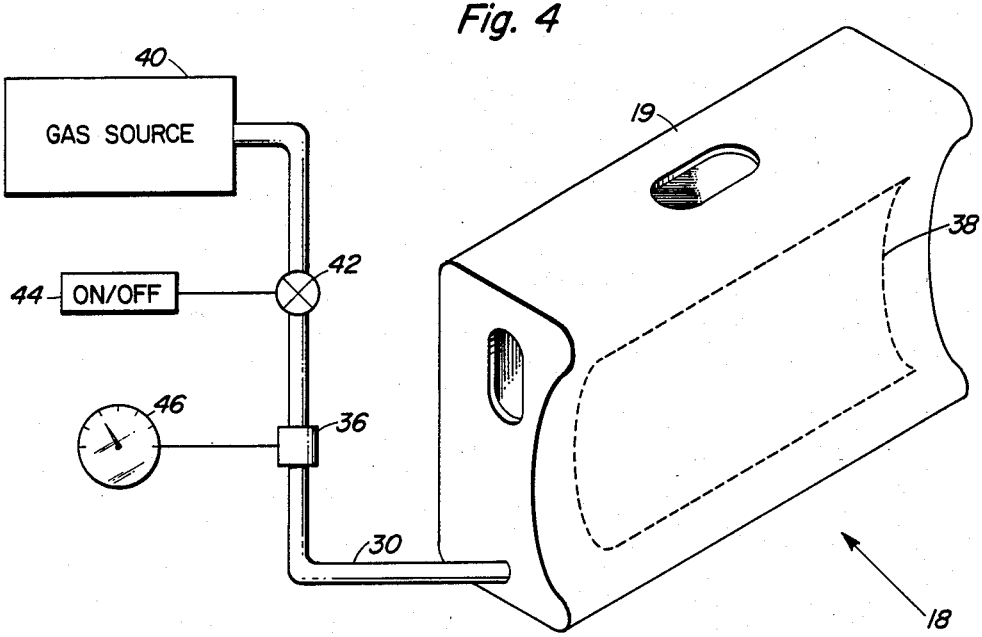
FIG. 4 shows one possible embodiment of the present invention with respect to an inflatable fuel tank.

In FIG. 1 a bullet 10 traveling along path 12 has passed through an aircraft outer wall 14. Outer wall 14, or mold line as it is sometimes called, has a rupture aperture 16 which is comparable in size to bullet 10. Upon entering fuel tank 18 through a wall 19 the speed of the bullet causes a hydrodynamic ram effect in the liquid fuel which expands the exit hole caused by bullet 10 to tremendous dimensions compared to the size of entrance aperture 16. Bullet 10 exits via wall 19 and an inner wall 22 of an inlet duct 24. Inner wall 22 which separates fuel tank 18 from inlet duct 24 is breached by exit hole 20 which permits fuel cloud 26 to be ingested by the aircraft engine. Large quantities of fuel are expelled into inlet duct 24 and are drawn into the engine. Severe damage to the engine by explosion or mechanical impingement of liquid fuel usually causes catastrophic failure of the engine, resulting in loss of the aircraft.

FIG. 2 represents a cross section of an aircraft engine inlet duct 24 defined by inner wall 22 which is next to aircraft fuel tank 18 within aircraft outer wall 14. Fuel tank 18 contains standard aviation fuel 32 or other fuel if nonaircraft use is envisioned. Between fuel 32 and inner wall 22 is an inflatable bladder 28 which has a pressure inlet 30 connected to bladder 28. It is evident that one side of bladder 28 is in contact, on one side, with fuel 32 while the opposite side is contact with wall 22. FIG. 2 shows an uninflated condition where the entire volume of fuel tank 18 is available to hold fuel 32. It is known that in this configuration the direct or close contact of the liquid fuel to the surrounding structure provides the danger of hydrodynamic ram phenomenon damage in the event of projectile penetration. This damage potential is significantly reduced if direct or close contact of fuel 32 and inner wall 22 can be eliminated. If the structure is decoupled from the liquid, the dynamic effects of the projectile in the liquid are not transmitted to the structure. Extreme overpressures are generated in the liquid when the projectile decelerates in the liquid. If the liquid is allowed to expand slightly, the overpressure is attenuated. Accompanying shock waves in the liquid are not transmitted to the structure if there is no direct coupling of the structure to the liquid.

FIG. 3 shows an airspace 34 between the liquid, fuel 32, and the structure, inner wall 22. Airspace 34 reduces projectile penetration damage to an acceptable level. If such an air gap is permanently designed between fuel 32 and duct wall 22, a severe penalty in reduced aircraft range is exacted, since fuel capacity is reduced by the amount of the air gap. Aircraft range is critical in combat aircraft. The inflatable nature of bladder 28 permits the aircraft to take on a full load of fuel, and fly to its combat area while bladder 28 is uninflated. After a portion of fuel 32 has been consumed, inflatable bladder 28 is filled through pressure inlet 30 to a predetermined pressure controlled by a pressure regulator 36 shown in FIG. 4. This causes an air space 34 to exist between fuel 32 and duct wall 22.

FIG. 4 shows a typical rubber bladder or fuel cell which serves for a fuel tank 18. A double layered section 38 of a wall of fuel tank 18 can provide the inflatable bladder of the present invention. Fuel tank 18 is usually made of heavy rubber which serves as wall 19. Double layered section 38 is created by a thinner more flexible layer of rubber or rubberized fabric which is sealed internally, by vulcanizing or similar method, to fuel tank wall 19 and connected via pressure inlet 30 to gas source 40. Gas source 40 may either be a tank which uses stored air, or pumps for engine bleed air.

In addition, tanks of stored inert gas such as nitrogen or helium or other suitable compounds may be used in place of air. Gases, such as ambient air, containing oxygen would support combustion. An on/off switch 44 is connected to a valve 42 to pressurize double layered section 38 at a preselected time. A pressure gage 46 is connected to regulator 36 to provide monitoring of the gas pressure.

In general, the double layered inflatable section shown in FIG. 4 represents the part of the bladder which is in contact with the inlet duct structure common to inlet duct wall 22 and the fuel tank cavity. Aircraft that do not use bladders in the fuel tank cavity of the type shown in FIG. 4, usually have integral fuel tanks. This protection concept is modified for use in integral tanks by bonding an inflatable bladder to inner wall 22 and routing the associated pressurization gas plumbing as required. This form of the invention may be thought of as being very similar to an inflated air mattress.

This device should be distinguished from self sealing fuel cells which are generally not effective against hydrodynamic ram effects because of the extremely high loads which are applied locally around exit holes. Self-sealing cells do not decouple the liquid from the structure, which is necessary to minimize the hydrodynamic ram damage.

Figure 5:
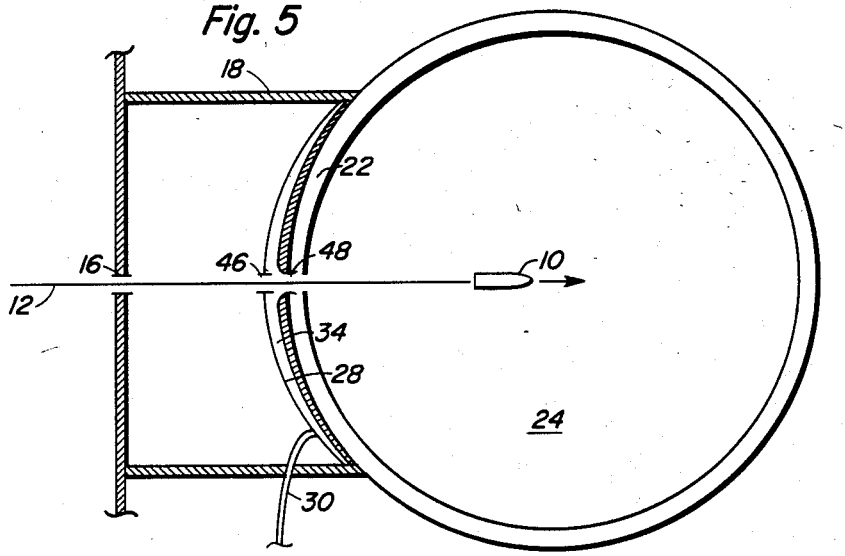
FIG. 5 shows the comparable effects of bullet penetration in the present invention as compared to FIG. 1.

FIG. 5 illustrates the penetration characteristics of bullet 10 when an inflated bladder is inserted in an integral fuel tank 18. When inflatable bladder 28 provides airspace 34, exit appertures 46 and 48 do not expand because of hydrodynamic ram pressure. Rather, the hydrodynamic ram pressure is absorbed by airspace 34 so that only physical impact of bullet 10 creates an exit hole. The reduced exit area drastically limits the flow rate of fuel into inlet duct 24 as compared to the unprotected fuel tank of FIG. 1.

Figure 6:
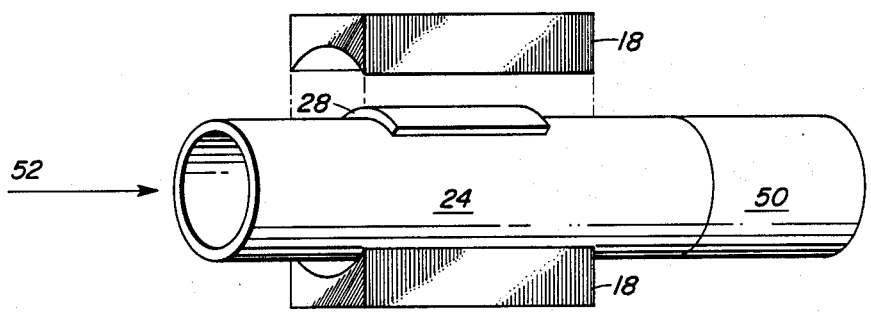
FIG. 6 shows a typical arrangement for a jet aircraft of fuel tanks with respect to aircraft inlet ducts.

FIG. 6 shows a type of arrangement common on jet aircraft. Fuel tanks 18 surround inlet duct 24. Inlet duct 24 has high volume air flow along arrow 52 fed into an engine 50. Any rupturing of fuel tank 18 and fuel spill into inlet duct 24 sees the fuel swept immediately into engine 50. Placing an inflatable bladder 28 between fuel tanks 18 and inlet duct 24 serves to limit the catastrophic effects of raw fuel entering engine 50. As described above, inflatable bladder 28 may be placed within fuel tank 18 or form a wall of fuel tank 18.

It is obvious to those skilled in the art that modifications to the present invention may be made.

What is claimed is:

1. In an aircraft having a fuel tank having an inner wall and adapted for containing liquid fuel, an engine air inlet duct juxtapositioned to the inner wall of said tank, and a buffer, the improvement comprising:
   an inflatable bladder disposed within the tank, said bladder having one side in contact with the fuel and an opposite side in contact with the inner wall of said tank adjacent said duct; and
   regulated gas source means connected to said inflatable bladder for extending said inflatable bladder with gas at a predetermined pressure from a collapsed minimum volume to a larger inflated volume so as to separate the fuel from said inner wall by a predetermined gas space when a predetermined amount of liquid fuel has been expended, such that the fluid dynamic ram effect damage and consequent influx of liquid fuel into said intake duct through projectile holes is minimized.

* * * * *